(12) United States Patent
Saavedra Salinas (10) Patent No.: US 9,255,308 B2
(45) Date of Patent: Feb. 9, 2016

(54) METHODS OF COPPER EXTRACTION (71) Applicant: Matias Saavedra Salinas, Santiago (CL)

(72) Inventor: Matias Saavedra Salinas, Santiago (CL)

(73) Assignee: Soluciones Tecnológicas Mineras Coriolis Limitada, Vitacura (CL)

( * ) Notice: Subject to any disclaimer, the term of this patent is extended or adjusted under 35 U.S.C. 154(b) by 0 days.

(21) Appl. No.: 14/731,944

(22) Filed: Jun. 5, 2015

(65) Prior Publication Data

US 2015/0354025 A1 Dec. 10, 2015

Related U.S. Application Data

(60) Provisional application No. 62/009,017, filed on Jun. 6, 2014.

(51) Int. Cl.
| | |
|---|---|
| *C22B 3/06* | (2006.01) |
| *C22B 15/00* | (2006.01) |
| *C22B 1/00* | (2006.01) |
| *C22B 3/08* | (2006.01) |
| *C22B 3/20* | (2006.01) |
| *C22C 9/00* | (2006.01) |

(52) U.S. Cl.
CPC ............... *C22B 15/0071* (2013.01); *C22B 1/00* (2013.01); *C22B 3/06* (2013.01); *C22B 3/08* (2013.01); *C22B 3/20* (2013.01); *C22B 15/001* (2013.01); *C22B 15/0067* (2013.01); *C22B 15/0078* (2013.01); *C22B 15/0084* (2013.01); *C22C 9/00* (2013.01)

(58) Field of Classification Search
CPC .... C22B 3/06; C22B 15/0067; C22B 15/0078
See application file for complete search history.

(56) References Cited

U.S. PATENT DOCUMENTS

| | | |
|---|---|---|
| 3,148,051 A | 9/1964 | Chupungco et al. |
| 3,228,765 A | 1/1966 | Chupungeo, Jr. et al, |
| 3,637,371 A | 1/1972 | Mackiw et al. |
| 3,744,990 A | 7/1973 | Wilson |
| 3,751,240 A | 8/1973 | Green |
| 3,761,249 A | 9/1973 | Ritcey et al. |
| 3,891,522 A | 6/1975 | McKay et al. |
| 3,954,453 A | 5/1976 | Porth et al. |
| 3,975,190 A | 8/1976 | Van Der Meulen et al. |

(Continued)

FOREIGN PATENT DOCUMENTS

| | | | |
|---|---|---|---|
| CN | 102021325 A | * | 4/2011 |
| CN | 102688809 A | | 9/2012 |
| CN | 102994747 A | * | 3/2013 |

OTHER PUBLICATIONS

Yongde et al. Patent No. CN 102994747 published Mar. 2013. Machine translation.*

(Continued)

*Primary Examiner* — George Wyszomierski
*Assistant Examiner* — Tima M McGuthry Banks
(74) *Attorney, Agent, or Firm* — Burns & Levinson LLP (57) ABSTRACT

The hydrometallurgical copper extraction processes of the present teachings generally including two steps: a conditioning or activating step using low concentrations of ammonia and ammonium in an aqueous solution; and an acid leaching step. The processes of the present teachings can be performed at low temperature, for example, at ambient temperature, and at atmospheric pressure.

27 Claims, 1 Drawing Sheet

(56) References Cited

U.S. PATENT DOCUMENTS

| | | | |
|---|---|---|---|
| 3,985,553 A * | 10/1976 | Kunda et al. | 75/718 |
| 4,022,866 A | 5/1977 | Kuhn et al. | |
| 4,036,639 A * | 7/1977 | Yurko | 75/718 |
| 4,043,882 A | 8/1977 | Skarbo et al. | |
| 4,080,419 A | 3/1978 | Engelmann | |
| 4,165,264 A | 8/1979 | Satchell, Jr. | |
| 4,189,461 A | 2/1980 | Lueders et al. | |
| 4,229,212 A | 10/1980 | Parker et al. | |
| 4,291,920 A | 9/1981 | Lingane et al. | |
| 4,343,773 A * | 8/1982 | Miller et al. | 423/27 |
| 5,316,751 A | 5/1994 | Kingsley et al. | |
| 5,492,681 A | 2/1996 | Pasek et al. | |
| 5,908,605 A | 6/1999 | Virnig et al. | |
| 5,989,311 A * | 11/1999 | Han et al. | 75/743 |
| 8,388,729 B2 | 3/2013 | Welham et al. | |
| 2012/0103827 A1 | 5/2012 | Ruonala et al. | |
| 2012/0148461 A1 * | 6/2012 | Rosenberg et al. | 423/53 |

OTHER PUBLICATIONS

Yongde et al. Patent No. CN 102994747 published Mar. 2013. Abstract.*

Yunfeng et al. Patent No. CN 102021325 published Apr. 2011. Machine translation.*

Yunfeng et al. Patent No. CN 102021325 published Apr. 2011. Abstract.*

Barr et al., "CESL Copper Process—An Economic Alternative to Smelting," dated 2005, 13 pages.

Dreisinger, "Copper leaching from primary sulfides; Options for biological and chemical extraction of copper," Hydrometallurgy, 83:10-20, 2006.

Garlapalli et al., "Leaching of Chalcopyrite with Sodium Hypochlorite," Metallurgical and Materials Transactions B, 41(2):308-317, Apr. 2010 (abstract only).

Radmehr, et al., "Ammonia Leacing: A New Approach of Copper Industry in Hydrometallurgical Processes," J. Inst. Eng. India Ser. D, 94(2):95-104, Oct. 2013-Mar. 2014.

Prasad at al., "Alternative Processes for Treatment of Chalcopyrite—A Review," *Minerals Engineering*, 11(8):763-781 (1998).

International Search Report and Written Opinion for International Application No. PCT/IB2015/001706, dated Nov. 11, 2015 (11 pages).

* cited by examiner

METHODS OF COPPER EXTRACTION

REFERENCE TO RELATED APPLICATIONS

This application claims priority to and the benefit of U.S. Provisional Patent Application No. 62/009,017, filed on Jun. 6, 2014, the entire contents of which are incorporated by reference herein.

FIELD

The present teachings relate to copper extraction and recovery processes. More specifically, the present teachings relate to hydrometallurgical copper extraction processes.

BACKGROUND

Pure copper is rarely found in nature. Instead copper is usually combined with other elements in copper ores. Over a dozen copper ores are mined commercially around the world. Sulfide ores, in which copper is bonded to sulfur, are the most common. Other copper ores include oxide ores, carbonate ores, and mixed ores.

The processes for extracting copper from a copper ore varies according to the type of ore, the desired purity level of the final product, and other factors. Each process typically includes a series of steps during which unwanted components are removed physically, chemically and/or electrochemically, with the purity of copper increasing during the process. The first step often is the physical concentration of a copper ore into a copper concentrate, in which the level of copper can be increased from a few percent up to about 20% to 30%.

The extraction processes can be hydrometallurgical or pyrometallurgical. Hydrometallurgical processing of copper ores often results in incomplete recovery of copper and other precious metals, long cycle times, poor product quality, and the difficulty in disposal and/or treatment of reagents and by-products of the aqueous processes. Alternative copper extraction processes, particularly for refractory materials such as chalcopyrite or copper concentrates, can be conducted at high temperatures, under high pressure (e.g., an increased partial pressure of oxygen), and/or with strong chemical oxidants or expensive reagents.

Chalcopyrite ($CuFeS_2$) is one of the most abundant copper-bearing minerals, which accounts for approximately 70 percent of the world's known copper reserves. For more than 30 years, a significant number of processes have been developed to leach copper from chalcopyrite. A number of demonstration plant operations have been conducted, but none of the processes have become completely commercially operational. During the past decades, there has been a decline in copper grades, often remarked upon as a future challenge to the copper industry. The decline in ore grades is projected to continue and, in addition, ore mineralogy would become more complex. The need to process low-grade and/or complex chalcopyrite-containing ores has been the main driver for the development of hydrometallurgical processes.

Thus, there is a need to improve the hydrometallurgical extraction of copper from copper ores and copper concentrates.

SUMMARY

In light of the foregoing, the present teachings provide methods of extracting and of recovering copper from a copper ore or a copper concentrate that can address various deficiencies and/or shortcomings of the state-of-the-art, including those outlined above. In particular, unlike ammonia leaching processes that dissolve copper into solution, the processes of the present teachings can condition or activate a copper ore or a copper concentrate, using an aqueous solution that includes a concentration of ammonia and ammonium insufficient to dissolve directly a significant amount of the copper content in the copper ore or the copper concentrate. Copper can be recovered from the conditioned or activated copper ore or copper concentrate using standard acid leaching processes followed by standard copper recovery downstream operations such as solvent extraction and electrowinning.

More specifically, the copper extraction processes of the present teaching can be applicable to various copper ores and minerals such as low-grade and chalcopyrite-containing ores and generally including two steps: a conditioning or activating step; and an acid leaching step. Processes of the present teachings can be performed at low temperature, for example, at ambient temperature or about 30° C. Processes of the present teachings can be performed at atmospheric pressure. In addition to these mild processing conditions, the processes of the present teachings generally do not require expensive reagents or strong chemical oxidants. Rather, low concentrations of relatively inexpensive and readily available reagents can be used. For example, the processes of the present teachings can permit the high yield extraction and recovery of copper from high percentage chalcopyrite-containing ores at a relatively high rate.

Thus, in one aspect, the present teachings provide methods of extracting copper from a copper ore or a copper concentrate. The methods generally include a conditioning or activating step such as contacting a copper ore or a copper concentrate with an aqueous solution comprising ammonia and ammonium in the presence of an oxygen gas-containing fluid such as air to provide a (solid) activated copper ore or a (solid) activated copper concentrate; and an acid leaching step such as leaching with an acid the solid activated copper ore or the solid activated copper concentrate to provide a pregnant leaching solution. The methods can include recovering the copper from the pregnant leaching solution.

In various embodiments, the conditioning or activating step of the methods of the present teachings can include contacting at a temperature less than about 50° C. a copper ore or a copper concentrate with an aqueous solution comprising ammonia and ammonium in the presence of an oxygen gas-containing fluid to provide an activated copper ore or an activated copper concentrate, which activated copper ore or activated copper concentrate can be subjected to an acid leaching process.

In some embodiments, the conditioning or activating step of the methods of the present teachings can include contacting a copper ore or a copper concentrate with an aqueous solution comprising ammonia and ammonium in the presence of an oxygen gas-containing fluid to provide an activated copper ore or an activated copper concentrate, where the aqueous solution has a pH between about 8 to about 10. The activated copper ore or the activated copper concentrate then can be subjected to an acid leaching process.

In certain embodiments, the conditioning or activating step of the methods of the present teachings can include contacting at atmospheric pressure a copper ore or a copper concentrate with an aqueous solution comprising ammonia and ammonium in the presence of an oxygen gas-containing fluid to provide a solid activated copper ore or a solid activated copper concentrate, which solid activated copper ore or a solid activated copper concentrate can be subjected to an acid leaching process.

In various embodiments, the methods of the present teachings can include repeating the conditioning or activating step and the acid leaching step. For example, the methods can include collecting the solids remaining after leaching with an acid; repeating the contacting step with the collected solids to provide activated solids; and leaching with an acid the activated solids to provide another pregnant leaching solution.

In some embodiments, the methods of the present teachings can include separating the solid activated ore or the solid activated copper concentrate from the aqueous solution comprising ammonia and ammonium. The separated aqueous solution comprising ammonia and ammonium then can be reused in another contacting step with another copper ore or another copper concentrate, or with the collected solids remaining after leaching an activated copper ore or concentrate with an acid. In such methods, the separated or recovered aqueous solution can be reused several times without any substantial changes to the solution, other than eventual addition of reagents and/or water to replenish the solution to its original condition.

In another aspect, the present teachings include copper recovered from or using a process as taught and described herein as well as articles of manufacture made with the copper recovered from or using a process as taught and described herein.

The foregoing as well as other features and advantages of the present teachings will be more fully understood from the following figures, description, examples, and claims.

DESCRIPTION OF DRAWING

It should be understood that the drawing described below is for illustration purposes only. The drawing is not intended to limit the scope of the present teachings in any way

DETAILED DESCRIPTION

It now has been discovered that copper can be hydrometallurgically extracted from copper ores and copper concentrates, and particularly from low-grade and/or complex chalcopyritic-containing ores, under mild conditions and using readily available and relatively inexpensive reagents including ammonium salts. That is, the present teachings provide methods or processes for the extraction and/or recovery of copper from copper ores and from copper concentrates using an aqueous solution to condition or activate the copper ore or the copper concentrate; and an acid leach of the activated copper ore or the activated copper concentrate to create a pregnant leaching solution.

More specifically, the present teachings provide methods or processes for the extraction and/or recovery of copper from copper ores and from copper concentrates using a multi-step process. In a (first) conditioning or activating step, an aqueous solution including low concentrations of ammonia and ammonium can contact a copper ore or a copper concentrate to provide a solid activated copper ore or a solid activated copper concentrate. The solid activated copper ore or the solid activated copper concentrate then can be subjected to leaching with an acid to provide a pregnant leaching solution. Finally, the methods can include recovering the copper from the pregnant leaching solution.

The processes of the present teachings can be applied or used in diverse operational contexts and processes such as dump leaching, heap leaching, in situ leaching, tank leaching, vat leaching, and concentrates leaching.

Throughout the application, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein. For example, where reference is made to a particular structure, that structure can be used in various embodiments of apparatus of the present teachings and/or in methods of the present teachings, unless otherwise understood from the context.

It should be understood that the expression "at least one of" includes individually each of the recited objects after the expression and the various combinations of two or more of the recited objects unless otherwise understood from the context and use.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. Moreover, two or more steps or actions may be conducted simultaneously.

At various places in the present specification, values are disclosed in groups or in ranges. It is specifically intended that the description include each and every individual subcombination of the members of such groups and ranges and any combination of the various endpoints of such groups or ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

The use of any and all examples, or exemplary language herein, for example, "such as" or "including," is intended merely to illustrate better the present teachings and does not pose a limitation on the scope of the invention unless claimed.

No language in the specification should be construed as indicating any non-claimed element as essential to the practice of the present teachings.

As used herein, an "ore" refers to a type of rock that contains minerals with elements including metals that can be economically extracted from the rock.

A "copper ore" refers to an ore that includes a copper compound including pure copper. Examples of copper ores include sulfide ores (which contain a copper sulfide), oxide ores (which contain a copper oxide), carbonate ores (which contain copper carbonate), and mixed ores.

As used herein, a "copper concentrate" refers to a copper ore that has been crushed, milled and concentrated to provide an increased amount or percentage of copper in the resulting material than found in the original ore(s).

As used herein, a "copper compound" refers to the various minerals that include copper as an element and can refer copper as a pure metal, unless the context dictates otherwise. Examples of minerals including copper are atacamite, azurite, bornite, chalcocite, chalcopyrite, chrysolcolla, covellite, cuprite, malachite, tennantite, and tetrahedrite.

As used herein, a "copper carbonate" refers to one or more members of a family of chemical compounds and minerals where the compound or mineral contains the element copper associated with a carbonate group. Examples of copper carbonates include malachite ($Cu(OH)_2.CuCO_3$), a green powder; and azurite ($Cu(OH)_2.2CuCO_3$), a blue powder.

As used herein, a "copper sulfide" refers to one or more members of a family of chemical compounds and minerals with the formula $Cu_xS_y$, including mixed copper-metal sulfides and mixed copper-metalloid sulfides containing copper and sulfur such as mixed copper-iron sulfides and mixed copper-arsenic sulfides. Examples of copper sulfide minerals include chalcocite ($Cu_2S$) and covellite (CuS) and the minerals, bornite ($2Cu_2S.CuS.FeS$) and chalcopyrite ($CuFeS_2$), which are mixed copper-iron sulfides, and enargite ($Cu_3AsS_4$), which is a mixed copper-arsenic sulfide.

As used herein, a "copper oxide" refers to one or more members of family of chemical compounds and minerals where the compound or mineral contains the element copper associated with oxygen. Examples of copper oxides include cuprite ($Cu_2O$ (cuprous oxide)), a red powder; cupric oxide (CuO), a black powder; and copper (III) oxide ($Cu_2O_3$).

As used herein, an "oxygen gas-containing fluid" refers to liquid and/or gas including oxygen gas or dissolved oxygen. An oxygen gas-containing fluid can be an oxygen-containing gas such as air or gaseous oxygen, both of which can be with another carrier gas or liquid. An oxygen gas-containing fluid can be an oxygenated liquid such as oxygenated water or water including dissolved oxygen. The source of dissolved oxygen can be the surrounding air, which can be at atmospheric pressure.

As described herein, copper extraction processes of the present teachings generally include two steps: a first conditioning or activating step; and a second acid leaching step. The conditioning or activating of a copper ore or copper concentrate can provide a solid activated copper ore or a solid activated copper concentrate, which activated solids can be leached with acid to provide a pregnant leaching solution. Copper then can be recovered from the pregnant leaching solution.

More specifically, the conditioning or activating step can include contacting a copper ore or a copper concentrate with an aqueous solution comprising ammonia and ammonium in the presence of an oxygen gas-containing fluid to provide a (solid) activated copper ore or a (solid) activated copper concentrate.

Unlike ammonia leaching processes, the conditioning of the copper ore or the copper concentrate includes using an aqueous solution that includes a concentration of ammonia and ammonium insufficient to dissolve directly more than a majority of the copper and/or copper compounds in the copper ore or the copper concentrate. For example, the aqueous solution can include a concentration of ammonia and ammonium insufficient to dissolve directly more than about 40% of the copper recovered from the copper ore or the copper concentrate. In certain embodiments, the aqueous solution can include a concentration of ammonia and ammonium insufficient to dissolve directly more than about 30%, more than about 25%, more than about 20%, more than about 15%, more than about 10%, more than about 8%, more than about 5%, more than about 3%, more than about 2%, or less of the copper recovered from the copper ore or the copper concentrate. In certain embodiments, the aqueous solution includes a concentration of ammonia and ammonium insufficient to dissolve directly more than 25%, more than 20%, or more than 15% of the copper recovered from the copper ore or the copper concentrate.

Because copper is not soluble at a pH higher than about 5, the dissolution of copper at higher pH's such as between a pH of 6 to 10 can be accomplished by the formation of complexes, for example, with ammonia. Any copper dissolved in an aqueous solution containing ammonia and ammonium at a pH of 9 would be complexed with ammonia. The use of the term "directly" in relation to dissolution of copper refers to the conditions present during the step of the process or method in which this term is used. For example, if the aqueous solution including ammonia and ammonium can dissolve directly no more than 20% of the copper recovered in the process, then the aqueous solution can dissolve no more than 20% of the recovered copper in the step in which the aqueous solution is being used, for example, in a conditioning or activating step, and does not include the dissolution of copper during other steps, for example, an acid leaching or other subsequent processing or steps.

In some embodiments of the methods of the present teachings, the aqueous solution can include between about 1 mg/L to about 40 g/L of ammonia and ammonium. In certain embodiments, the aqueous solution can include between about 1 mg/L to about 30 g/L, between about 1 mg/L to about 20 g/L, between about 1 mg/L to about 15 g/L, between about 1 mg/L to about 10 g/L, between about 1 mg/L to about 5 g/L, between about 1 mg/L to about 1 g/L, or between about 1 mg/L to about 500 mg/L, of ammonia and ammonium. In particular embodiments, the aqueous solution can include between about 1 mg/L to about 30 g/L, between about 1 mg/L to about 20 g/L, or about 100 mg/L to about 20 g/L.

In various embodiments of the methods of the present teachings, the ammonium can be derived from one or more sources of ammonium ions, such as ammonium carbonate, ammonium chloride, ammonium hydroxide, ammonium nitrate, and ammonium sulfate. As used herein "ammonium" refers $NH_4^+$ or an ammonium ion, which terms and formula can be used interchangeably herein. In particular embodiments, the source of ammonium is ammonium sulfate. The source of ammonia, indirectly, can be ammonium sulfate.

It should be understood that the ammonia present in the aqueous solution can be derived from the source of ammonium. That is, free ammonia or gaseous ammonia need not be introduced into the aqueous solution used in the conditioning or activating step, but rather the ammonia can be derived in situ from the equilibrium of the ammonium ions in the aqueous solution. As discussed in more detail herein, when ammonium ions are in an aqueous solution, an equilibrium exists with the ammonium ions and ammonia, which equilibrium is pH dependent. Thus, upon the dissolution of the source of ammonium in water to provide, in part, the aqueous conditioning or activating solution, ammonia can be generated, which ammonia can participate in the hydrometallurgical processes.

In some embodiments, the ammonia and ammonium can be derived from gaseous ammonia delivered in an appropriate amount to water or an aqueous solution, whereby the ammonia in water forms an equilibrium between the ammonia and ammonium as described herein, which equilibrium is pH dependent.

In some embodiments of the present teachings, the conditioning or activating step can be conducted or carried out at an atmospheric pressure. In certain embodiments, the conditioning or activating step can be conducted at a higher pressure, for example, in a pressure chamber or vessel such as an autoclave. The higher or increased pressure can include an increased pressure of oxygen (e.g., an increased oxygen partial pressure). For example, the conditioning step can be carried out or conducted at or under an increased partial pressure of oxygen or increased oxygen partial pressure, for example, at about 5 psi, at about 10 psi, at about 15 psi, or higher of oxygen partial pressure.

The aqueous solution including ammonia and ammonium can have a pH from about 5 to about 10. In certain embodiments, the pH of the aqueous solution can be between about 5 to about 10, between about 6 to about 10, between about 6 to about 9, between about 6 to about 8, between about 7 to about 10, between about 7 to about 9, between about 7 to about 8, between about 8 to about 10, between about 8 to about 9.5, between about 8 to about 9, between about 8.5 to about 10, between about 8.5 to about 9.5, between about 8.5 to about 9, between about 9 to about 10, between about 9 to about 9.5, between about 6 to about 10, or between about 6 to about 10. In particular embodiments, the pH of the aqueous solution can be between about 8 to about 9.5, between about 8.5 to about 9.5, between about 9 to about 9.5, between about 8 to about 9, between about 8 to about 8.5, or between about 8.5 to about 9.

The pH of the aqueous solution can be adjusted, regulated and/or maintained as appropriate for the particular conditioning or activating process and other factors such as the copper ore or copper concentrate to be processed. A base such as sodium hydroxide or another alkaline compound can be used to adjust the pH of the aqueous solution. Use of a base or alkaline compound can be avoided if the ammonia and ammonium-generating reagent(s) is of sufficient alkalinity thereby providing a pH of the aqueous solution in a range as described herein for the conditioning or activating step.

In some embodiments, the conditioning or activating step can be conducted or carried out at ambient temperature. The conditioning or activating step can be conducted at a higher temperature, for example, at a temperature up to about 90° C. or about 95° C. In some embodiments, the conditioning or activating step can be conducted at a temperature between about ambient temperature and about 80° C., about 75° C., about 70° C., about 65° C., about 60° C., about 55° C., about 50° C., about 45° C., about 40° C., or between ambient temperature and about 35° C. In certain embodiments, the conditioning or activating step can be conducted at a temperature below about 80° C., below about 75° C., below about 70° C., below about 65° C., below about 60° C., below about 55° C., below about 50° C., below about 45° C., below about 40° C., or below about 35° C. It is also within the scope of the present teachings to conduct the conditioning or activating step at a temperature below ambient temperature. In particular embodiments, the conditioning or activating step is conducted at ambient temperature, at a temperature between ambient temperature and about 90° C., or at a temperature below about 50° C.

The conditioning or activating step can be conducted or carried out in the presence of an oxygen gas-containing fluid such as an oxygen-containing gas, for example, air. The oxygen gas-containing fluid such as air can be considered a mild oxidant. The conditioning step is typically carried out at atmospheric pressure. Accordingly, air can be delivered to the aqueous solution, for example, under the surface of the aqueous solution such that the oxygen gas-containing gas is bubbled into and up through the aqueous solution to provide (dissolved) oxygen for this processing step. Other means for providing dissolved oxygen or oxygen gas into the aqueous solution can be used. The aeration technique can depend on the particular process and equipment being used for the conditioning or activating step (e.g., a heap or vat or reactor conditioning or activating technique or process). Accordingly, an appropriate aeration system can be used. For example, blowers can be used to provide the necessary air or oxygen into the aqueous solution. In some embodiments, the oxygen gas-containing fluid can be oxygenated water (i.e., water containing dissolved oxygen) that can be delivered into and/or circulated through the aqueous solution. The aqueous solution typically is aerated continuously throughout the conditioning or activating step.

It should be understood that the various parameters or conditions of the conditioning or activating step, for example, temperature, pressure, pH of the aqueous solution including ammonia and ammonium, and the concentration of ammonia and ammonium can be varied as described herein in various combinations and values or ranges and such combinations of conditions and values or ranges thereof are within the scope of the present teachings.

Following the conditioning or activating of the copper ore or the copper concentrate, the solid activated ore or the solid activated copper concentrate is subjected to conventional acid leaching to create or provide a pregnant leaching solution. As already stated, the processes of the present teachings are dissimilar from ammonia leaching processes as the conditioning or activating step does not intend to solubilize the copper or copper compounds present in the copper ore or copper concentrate upon treatment with the aqueous solution including ammonia and ammonium. Rather the solid material resulting from the conditioning or activating step, i.e., the activated copper ore or activated copper concentrate (or activated solids), is subjected to acid leaching to remove the copper and copper compounds from the solid activated ore or solid activated copper concentrate.

The acid leaching step can be carried out at a pH of between about 1.5 to about 5, for example, a pH between about 3 to about 5 or between about 2 to about 4. The acid leaching step can result in the dissolution of the copper and/or copper compounds that remained solid after the conditioning or activating step. The acid leaching step can be conducted or carried out in the presence of an oxygen gas-containing fluid, such as air or dissolved oxygen. The acid leaching solution can be aerated as appropriate for the particular equipment and techniques used.

The acid leaching step can result in a pregnant leaching solution, for example, a copper-loaded pregnant leaching solution. The pregnant leaching solution can have similar characteristics to pregnant leaching solutions from standard leaching processes. The pregnant leaching solution can have very low or trace amounts of ammonia and ammonium, which compounds can interfere with downstream solvent extraction processes or operations. Consequently, the pregnant leaching solution can be channeled through standard copper recovery downstream operations such as solvent extraction and electrowinning without further modification. In addition, the short cycle time of the acid leaching process can prevent the substantial dissolution of undesired chemical species, for example, iron and/or chloride. Finally, the copper then can be collected and used in standard fashion.

The acid leaching step typically is conducted on activated solids such as the activated copper ore or the activated copper concentrate, which activated solids can be separated from the aqueous solution including ammonia and ammonium, i.e., the acid leaching is carried out separate from the conditioning or activating step and solution. However, the present teachings also include the direct addition of an acid (leaching acid) into the mixture resulting from the conditioning or activating step, thereby lowering the pH of the aqueous solution in situ.

In various embodiments, the conditioning or activating and acid leaching steps or processes can be repeated or iterated one, two, three, or more times, for example, until the desired level of copper extraction is achieved. Accordingly, in some embodiments, the methods of the present teachings can further include collecting the solids remaining after leaching with an acid; repeating the contacting step with the collected solids to provide activated solids; and leaching with an acid the activated solids to provide another pregnant leaching solution. This general cycle can be repeated one, two, three, four, or more times as needed or desired.

In some embodiments, where the activate copper ore or the activated copper concentrate is separated from the aqueous ammonia and ammonium solution before being subjected to acid leaching, the aqueous solution can be used again to condition or activate another copper ore or copper concentrate, or the solids remaining after the acid leaching step, where the solids from the acid leaching step are collected and contacted with the aqueous solution first used to condition or activate the copper ore or copper concentrate. Thus, in certain embodiments of the present teachings, the methods can include separating the solid activated copper ore or the solid activated copper concentrate from the aqueous solution comprising ammonia and ammonium, wherein the aqueous solution comprising ammonia and ammonium is reusable or reused in the contacting step with another copper ore or another copper concentrate, or with the collected solids remaining after leaching with an acid.

In the case where the aqueous solution containing ammonia and ammonium is separated from the activated solids and reused, the reused aqueous solution already should be "saturated" with a small fraction of the soluble copper complexes or copper compounds that are formed such that a reused aqueous solution should not dissolve any more copper or copper compounds present in a few or fresh copper ore or copper concentrate, or collected solids remaining from an acid leaching step, that is contacted with the reused aqueous solution.

Similar to reusing the aqueous solution containing ammonia and ammonium, an acid leaching solution also can be reused in the form of a raffinate. For example, after the acid leaching solution contacts an activated copper ore or copper concentrate to provide a pregnant leaching solution, the copper can be depleted and recovered from the pregnant leaching solution along with the removal of other unwanted materials whereby the resultant solution (or raffinate) can similar to the original acid leaching solution, which can be reused or recirculated for additional leaching.

The conditioning or activating step or process usually is conducted or carried out over a time of about 6 hours to about a month, 6 weeks, 2 months, or more. The initial conditioning or activating step on new or unextracted copper ore or copper concentrate typically is conducted or carried out over a time of about 12 hours to about 3 days, to about 4 days, to about 5 days, to about 6 days, to about 7 days, to about 8 days, to about 9 days, to about 10 days, to about 11 days, to about 12 days, to about 2 weeks, to about 3 weeks, to about a month, to about 5 weeks, to about 6 weeks, or more. The acid leaching step or process usually is conducted or carried out over a time of about 30 minutes to about several hours, for example, from about one hour to about 6 hours, 12 hours, or one day, or more. Depending on the particular acid leaching process and equipment, cycle times can be much longer. For example, for heap leaching, a typical cycle time for acid leaching of sulfides can be up to one year, or more.

In the embodiments where the conditioning or activating and acid leaching steps are repeated, the repetition of the conditioning or activating steps can be conducted for a shorter time such as from about 3 hours to about 24 hours, for example, from about 4 hours to about 18 hours, or from about 6 hours to about 16 hours, or for about 12 hours. In such cases, the acid leaching step tends to be shorter than its initial time. That is, the repetition of the acid leaching step can occur over a time of about 30 minutes to about 3 hours, or about 1 hour to about 2 hours, or about 1 hour. It should be understood that these times should not be considered limiting because the cycle times can vary and be longer than those mentioned above depending on the particular process and equipment.

Accordingly, the entire processing time to achieve the desired extraction level of copper can be between about 1 day to about 6 to about 7 weeks; however, between about 1 day to about 6 or 8 days is more common. Again, depending on the particular processes and equipment, the entire processing time can be much longer, for example, up to a month, a few months, several months, a year, a few years, or more.

In various embodiments, the present teachings provide methods of extracting copper that include contacting a copper ore or a copper concentrate with an aqueous solution including ammonia and ammonium in the presence of air to provide a solid activated copper ore or a solid activated copper concentrate; and leaching with an acid the solid activated copper ore or the solid activated copper concentrate to provide a pregnant leaching solution, where the aqueous solution has a pH in the range of about 7 to about 10. In certain embodiments, the aqueous solution has a pH between about 8 to about 10. In particular embodiments, the aqueous solution has a pH between about 8 to about 9.5. The methods can include repeating the contacting and leaching steps with the solids recovered from the acid leaching and/or recovering copper from the pregnant leaching solution.

In some embodiments, the present teachings provide methods of extracting copper that include contacting at atmospheric pressure a copper ore or a copper concentrate with an aqueous solution including ammonia and ammonium in the presence of air to provide an activated copper ore or an activated copper concentrate; and leaching with an acid the activated copper ore or the activated copper concentrate to provide a pregnant leaching solution, where the aqueous solution has a pH in the range of about 8 to about 10. The methods can include repeating the contacting and leaching steps with the solids recovered from the acid leaching and/or recovering copper from the pregnant leaching solution.

In certain embodiments, the present teachings provide methods of extracting copper that include contacting at atmospheric pressure in a temperature range between ambient temperature and about 90° C. a copper ore or a copper concentrate with an aqueous solution including ammonia and ammonium in the presence of air to provide an activated copper ore or an activated copper concentrate; and leaching with an acid the activated copper ore or the activated copper concentrate to provide a pregnant leaching solution, where the aqueous solution has a pH in the range of about 8 to about 10. The methods can include repeating the contacting and leaching steps with the solids recovered from the acid leaching and/or recovering copper from the pregnant leaching solution.

In particular embodiments, the present teachings provide methods of extracting copper that include contacting at atmospheric pressure at a temperature less than about 50° C. a copper ore or a copper concentrate with an aqueous solution including ammonia and ammonium in the presence of air to provide an activated copper ore or an activated copper concentrate; and leaching with an acid the activated copper ore or the activated copper concentrate to provide a pregnant leaching solution, where the aqueous solution has a pH in the range of about 8 to about 10. The methods can include repeating the contacting and leaching steps with the solids recovered from the acid leaching and/or recovering copper from the pregnant leaching solution.

As described herein, the present teachings include a copper extraction process that can be generally carried out in two steps. Step 1, a conditioning step, can include conditioning a copper ore or a copper concentrate with ammonium and ammonia at low concentrations, which are insufficient to allow the formation of substantial amounts of soluble copper ammoniacal complexes, carried out at neutral or slightly alkaline pH (e.g., a pH range from about 6 to about 10, such as a pH between 8 and 9.5). The conditioning solution can include an ammonium compound in a concentration range of from about 1 mg/L to about 20 g/L or up to about 150 g/L. The source of ammonium can include ammonium sulfate, ammonium chloride, ammonium nitrate, ammonium hydroxide, and combinations thereof. Sodium hydroxide (or another alkaline compound) can be used to adjust the pH. The amount used can depend on the consumption of hydroxide by the treated mineral.

Without wishing to be bound to any particular theory, in the first conditioning or activating step, it is believed that the copper in the form of a primary sulfide (e.g., chalcopyrite), is extracted by the ammoniacal solution, but due to the low concentration of ammonia (insufficient substantially to form soluble copper complexes), the copper is not in a soluble state in the pregnant leaching solution ("PLS"), but instead in a solid state in the form of compounds that are insoluble in almost-neutral or alkaline pH solutions, such as copper hydroxides, copper oxides, and possibly other compounds.

The hydroxides, oxides or other solid copper compounds generated, although insoluble at almost-neutral or alkaline pH, are extremely soluble at acidic pH (e.g., below pH 4). For this reason, after the first step is completed, the copper can be recovered in a soluble form by relatively conventional acid leaching, which is step 2 of the extraction process.

Step 2, a conventional or standard acid leaching step, can be carried out at a pH of about 0.5 to about 5, which can solubilize the copper that was conditioned or activated in the first step, which copper is believed to be in the form of hydroxide, an oxide, or another solid copper compound that is very soluble in acid. The acid leaching step can be characterized by very rapid kinetics (with a cycle time significantly lower (or faster) than step 1). The result obtained is a PLS with a high concentration of copper, very similar to the PLS from conventional acid leaching processes, and with very low amounts or traces of ammonium and ammonia, which could interfere with the downstream operation of solvent extraction and electrowinning ("SX-EW").

Without wishing to be bound by any particular theory, the following discussion is intended to illustrate a possible mechanism explaining the phenomena of the present teachings, without attempting to describe the only chemical reactions involved.

During step 1 of the process of the present teachings, the copper present as a copper sulfide can be extracted in the form of insoluble copper hydroxide, for example, according to the following proposed equation:

$$CuFeS_2+4NaOH+NH_3(aq)+4O_2 \rightarrow Cu(OH)_2(s)+Fe(OH)_2(s)+2Na_2SO_4(aq)+NH_3(aq)$$

The reaction is catalyzed by the limiting aqueous ammonia, which is neither consumed nor generated in the context of the reaction. Obviously, ammonia is a gas, so that, despite being highly soluble in water, it evaporates, which constitutes a potential source of reagent loss. However, when conducted in a closed environment process or a closed environment such as in a reactor, the ammonia can be recovered.

In the aqueous conditioning solution, ammonia ($NH_3$) and ammonium ($NH_4^+$) are in equilibrium, according to the following equilibrium equation:

$$NH_4^+ + OH^- \leftrightarrow NH_3(aq)$$

This equilibrium is, in turn, strongly influenced by pH. Thus, at a pH slightly above 9, the ratio of ammonium/ammonia is about 50:50; and at pH slightly above 8, the ratio changes to 90:10 (with very little ammonia and, thus, a very low evaporation rate, especially considering the low total concentration of ammonium salts used in the process).

During step 2 of the process of the present teachings, the copper hydroxide generated in step 1 is dissolved in an acid medium, according to the following equation (with net consumption of acid (protons)):

$$Cu(OH)_2(s)+H_2SO_4(aq) \rightarrow Cu^{2+}+SO_4^{2-}+2H_2O$$

The following examples are provided to illustrate further and to facilitate the understanding of the present teachings and are not in any way intended to limit the invention.

EXAMPLE 1

Copper Extraction from Highly Chalcopyritic Ore

The copper ore was a low copper grade, highly chalcopyritic ore, characterized by a total copper content of 0.41%, being 88% of the copper present in the form of chalcopyrite. The granulometry of the copper ore was brought to 100%-150 Tyler Mesh.

In a one liter Erlenmeyer flask, 120 g of the copper ore was mixed with 400 mL of an ammonium sulfate solution containing 10 g/L ammonium sulfate at a pH of 9.4. The pH of the ammonium sulfate solution was adjusted to 9.4 by addition of sodium hydroxide. The mixture was reacted at 30° C. with mild agitation on an orbital shaker incubator for 2 days (step 1).

At the end of the reaction period, sulfuric acid was added to the mixture to adjust the pH to 2.5 and standard acid leaching was performed (step 2). The acidified slurry was maintained under the same conditions described above for 2 additional hours, after which the resulting pregnant leaching solution was separated from the solid residue by filtration. A sample of the resulting pregnant leaching solution was analyzed for copper content The above process was repeated where the conditioning or activating step, i.e., step 1, was conducted for 4 days, 6 days, 8 days, 10 days, and 12 days, respectively. The results of the copper extraction are shown in Table 1 below and in FIG. 1.

Figure 1:
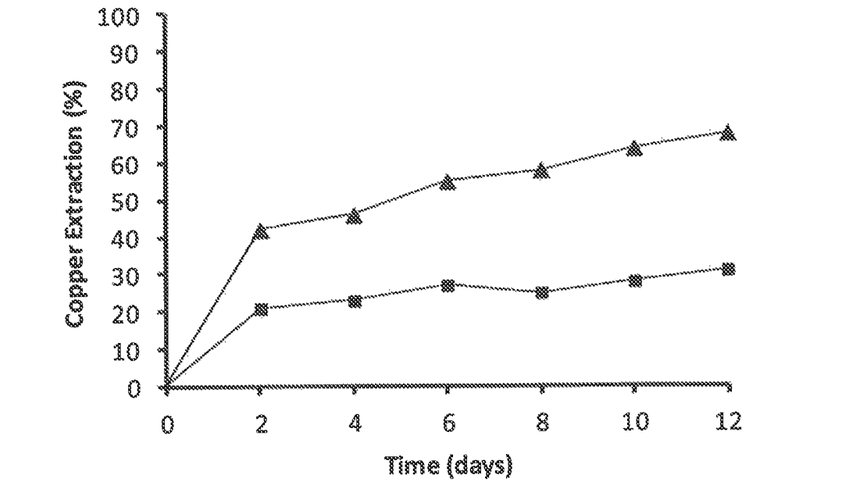
FIG. 1 is a graph of the percentage of copper extracted from a highly chalcopyritic ore using an embodiment of the process of the present teachings (triangles) compared to a standard acid leaching process (squares).

Also shown in Table 1 and in FIG. 1 are the results of copper extraction obtained by running a parallel set of standard acid leaching using a sulfuric acid solution at a pH range between 1.8 and 2.2, where the standard acid leaching was conducted for 2 days, 4 days, 6 days, 8 days, 10 days, and 12 days, respectively.

TABLE 1

| Time (days) | % Copper extracted (conditioning and acid leaching) | % Copper extracted (acid leaching only) |
| --- | --- | --- |
| 0 | 0 | 0 |
| 2 | 42 | 21 |
| 4 | 46 | 23 |
| 6 | 55 | 27 |
| 8 | 58 | 25 |
| 10 | 64 | 28 |
| 12 | 68 | 31 |

In addition, prior to step 2, i.e., the addition of the sulfuric acid to the conditioning solution, a sample of the aqueous solution containing ammonium sulfate (separated from the activated and other solids by centrifugation) was analyzed for copper content. The copper dissolved in the aqueous solution containing ammonium sulfate after the conditioning step was less than 5% of the copper recovered from the copper ore or copper concentrate. Thus, the majority of the copper was dissolved during the standard acid leaching step rather than during the conditioning or activating step.

It should be understood that the immediately above percentage is based on the amount of copper recovered from the process, which is distinct from the percentage of copper extracted from the copper ore or copper concentrate as determined in Table 1. That is, a percentage of copper extracted is based on the total copper content of the copper ore, copper concentrate or treated copper sample from which the copper is extracted. The percentage of copper extracted is an indicator of the performance of the process (i.e., the more copper extracted of the total copper available, the better). A percentage based on copper recovered from a copper ore or a copper concentrate such as during one iteration of the process (e.g., the two step process of the present teachings or a one step ammonia leaching process) can provide a indication of the amount of copper present, for example, in a solution or a step of the process.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

What is claimed is:

1. A method of extracting copper from a copper ore or a copper concentrate, the method comprising:
   contacting a copper ore or a copper concentrate with an aqueous solution comprising ammonia and ammonium in the presence of an oxygen gas-containing, fluid to provide a solid activated copper ore or a solid activated copper concentrate, wherein the aqueous solution is unable to dissolve directly more than a majority by weight of the copper recovered from the copper ore or the copper concentrate; and
   leaching the solid activated copper ore or the solid activated copper concentrate with an acid to provide a pregnant leaching solution.

2. The method of claim 1, further comprising recovering copper from the pregnant leaching solution.

3. The method of claim 1, wherein the ammonium is derived from one or more of ammonium carbonate, ammonium chloride, ammonium hydroxide, ammonium nitrate, and ammonium sulfate.

4. The method of claim 1, wherein the ammonia is derived in situ from the ammonium.

5. The method of claim 1, wherein contacting a copper ore or a copper concentrate with an aqueous solution is carried out at atmospheric pressure.

6. The method of claim 1, wherein contacting a copper ore or a copper concentrate with an aqueous solution is carried out at a temperature ranging from ambient temperature to about 90° C.

7. The method of claim 6, wherein the aqueous solution has a pH between about 7 to about 10.

8. The method of claim 7, wherein contacting a copper ore or a copper concentrate with an aqueous solution is carried out at atmosphere pressure.

9. The method of claim 8, wherein the aqueous solution has a pH between about 8 to about 9.5.

10. The method of claim 1, wherein the oxygen gas-containing fluid comprises air.

11. The method of claim 1, wherein the aqueous solution has a pH in the range of about 7 to about 10.

12. The method of claim 1, wherein the copper ore or the copper concentrate comprises chalcopyrite.

13. The method of claim 1, wherein solids remain after leaching with an acid, and the method further comprises:
   collecting the solids remaining after leaching with an acid;
   repeating the contacting with the collected solids to provide activated solids; and
   leaching the activated solids with an acid to provide another pregnant leaching solution.

14. The method of claim 1, further comprising separating the solid activated ore or the solid activated copper concentrate from the aqueous solution comprising ammonia and ammonium, wherein the aqueous solution comprising ammonia and ammonium is reusable to contact another ore comprising a copper compound or another copper concentrate.

15. A method of extracting copper from a copper ore or a copper concentrate, the method comprising:
   contacting a copper ore or a copper concentrate with an aqueous solution comprising ammonia and ammonium in the presence of an oxygen gas-containing, fluid to provide a solid activated copper ore or a solid activated copper concentrate, wherein the ammonia is derived in situ from the ammonium; and
   leaching the solid activated copper ore or the solid activated copper concentrate with an acid to provide a pregnant leaching solution.

16. The method of claim 15, wherein contacting a copper ore or a copper concentrate with an aqueous solution is carried out at atmospheric pressure.

17. The method of claim 15, wherein the aqueous solution has a pH in the range of about 7 to about 10.

18. The method of claim 17, wherein contacting a copper ore or a copper concentrate with an aqueous solution is carried out at a temperature ranging from ambient temperature to about 90°C.

19. The method of claim 18, wherein contacting a copper ore or a copper concentrate with an aqueous solution is carried out at atmosphere pressure.

20. A method of extracting copper from a copper ore or a copper concentrate, the method comprising:
   contacting a copper ore or a copper concentrate with an aqueous solution comprising ammonia and ammonium in the presence of an oxygen gas-containing fluid to provide a solid activated copper ore or a solid activated copper concentrate,
      wherein the aqueous solution has a pH between about 7 to about 10 and is unable to dissolve directly more than a majority by weight of the copper recovered from the copper ore or the copper concentrate; and
   leaching the solid activated copper ore or the solid activated copper concentrate with an acid to provide a pregnant leaching solution.

21. The method of claim 20, wherein contacting a copper ore or a copper concentrate with an aqueous solution is carried out at atmospheric pressure.

22. The method of claim 20, wherein contacting a copper ore or a copper concentrate with an aqueous solution is carried out at a temperature ranging from ambient temperature to about 90°C.

23. The method of claim 22, wherein contacting a copper ore or a copper concentrate with an aqueous solution is carried out at atmosphere pressure.

24. A method of extracting copper from a copper ore or a copper concentrate containing chalcopyrite, the method comprising:
   contacting a copper ore comprising chalcopyrite or a copper concentrate comprising chalcopyrite with an aqueous solution comprising ammonia and ammonium in the presence of an oxygen gas-containing fluid to provide a solid activated copper ore or a solid activated copper concentrate; and
   leaching the solid activated copper ore or the solid activated copper concentrate with an acid to provide a pregnant leaching solution.

25. The method of claim 24, wherein the aqueous solution has a pH between about 8 to 9.5.

26. The method of claim 25, wherein contacting a copper ore or a copper concentrate with an aqueous solution is carried out at a temperature ranging from ambient temperature to about 90°C.

27. The method of claim 26, wherein contacting a copper ore or a copper concentrate with an aqueous solution is carried out at atmosphere pressure.

* * * * *

UNITED STATES PATENT AND TRADEMARK OFFICE
CERTIFICATE OF CORRECTION

| | |
|---|---|
| PATENT NO. | : 9,255,308 B2 |
| APPLICATION NO. | : 14/731944 |
| DATED | : February 9, 2016 |
| INVENTOR(S) | : Matias Saavedra Salinas |

It is certified that error appears in the above-identified patent and that said Letters Patent is hereby corrected as shown below:

In The Claims

In claim 1, line 5, "oxygen gas-containing, fluid" should read --oxygen gas-containing fluid--.

In claim 15, line 5, "oxygen gas-containing, fluid" should read --oxygen gas-containing fluid--.

Signed and Sealed this
Tenth Day of May, 2016

Michelle K. Lee
*Director of the United States Patent and Trademark Office*